United States Patent [19]

Callen et al.

[11] 4,163,806
[45] Aug. 7, 1979

[54] CHEESE CAKE

[76] Inventors: Dennis M. Callen; Margo A. Callen, both of 4066 Montrose, Flint, Mich. 48504

[21] Appl. No.: 789,685

[22] Filed: Apr. 21, 1977

[51] Int. Cl.² ............................................. A23C 19/12
[52] U.S. Cl. .................................... 426/582; 426/564; 426/570; 426/524
[58] Field of Search ................ 426/564, 570, 582, 524

[56] References Cited

U.S. PATENT DOCUMENTS

| | | | |
|---|---|---|---|
| 2,112,442 | 3/1938 | Libanoff | 426/582 X |
| 2,714,069 | 7/1955 | Stuart et al. | 426/564 |
| 3,365,305 | 1/1968 | Hunter | 426/570 X |
| 3,455,698 | 7/1969 | Vakaleris | 426/582 X |

*Primary Examiner*—David M. Naff
*Attorney, Agent, or Firm*—Basile and Weintraub

[57] ABSTRACT

An unbaked cheese cake is prepared by forming a mixture consisting essentially of cream cheese, non-dairy whipped topping and powdered sugar and refrigerating the mixture until firm to produce the cheese cake in final form without baking.

7 Claims, No Drawings

CHEESE CAKE

BACKGROUND OF THE INVENTION

1. Field of the Invention

This invention relates to a food mix which can be easily prepared to provide a cheese cake without baking and to a process for the preparation of said cheese cake.

2. Prior Art

The prior art generally teaches the preparation of cheese cakes which require baking. Usually, the compositions include cream cheese, butter or vegetable shortening, flour, sugar, eggs, and sweet cream. These are blended together and baked for a period of time. Other prior art cheese cakes which require baking are taught in U.S. Pat. Nos. 2,112,442 and 3,455,698. A non-baked cheese cake may be prepared by blending cream cheese, lemon juice with Eagle Brand condensed milk followed by refrigeration. The embodiments of the instant invention afford a new composition for the preparation of a cheese cake which does not require baking.

SUMMARY OF THE INVENTION

A composition suitable for the preparation of a cheese cake which does not require baking is formulated from cream cheese, powdered sugar and non-dairy whipped topping.

DESCRIPTION OF THE PREFERRED EMBODIMENT

In accordance with the invention a cheese cake is prepared by blending cream cheese with powdered sugar, folding into the blend a quantity of non-dairy whipped topping and then refrigerating this mixture until the desired firmness of consistency is obtained. Add food coloring or flavorings to the topping; whip topping until firm, then whip in cream cheese a little at a time and then add sugar.

In the preferred embodiment of the invention a quantity of cream cheese is blended with such proportions of powdered sugar and non-dairy whipped topping that the concentration of the powdered sugar is 25 to 40 weight percent of the total weight of the mixture, the concentration of the non-dairy whipped topping is ten to 25 weight percent of the total weight of the mixture and the balance is cream cheese. The relative concentrations can however be varied so that the concentration of powdered sugar can range from about 30 to about 40 weight percent of the total weight of the mixture, the concentration of non-dairy whipped topping can range from about 15 to about 25 weight percent of the total weight of the mixture and the balance is cream cheese.

In the preferred embodiment the cheese cake is prepared by softening the desired quantity of cream cheese to the point where it is easily stirrable and blending it with the desired quantity of powdered sugar until a uniform mixture is obtained. A quantity of non-dairy whipped topping is then folded into the mixture. This resulting mixture is then transferred to a pan containing a crust of pre-baked crushed graham crackers and refrigerated, initially, for about one to five hours at about 20° to 32° F. and then at 40° F. for at least one hour or until the cheese cake has a consistency sufficiently firm to permit cutting. Alternatively, after the initial setting it may be frozen at about 0° to 10° F., immediately.

If desired, flavoring may be added to the mixture. Such flavoring may be butter, vanilla, fudge, banana, peanut butter, coffee, lemon, pineapple, or butterscotch according to one's individual taste. Generally, from 1 teaspoon to 1 tablespoon will suffice to give the desired flavor. Additionally, various toppings such as pineapple, lemon, cocoanut, chocolate or crushed peanuts may be used to cover the top of the cake.

The non-dairy whipped topping generally contains as principal ingredients, fats, emulsifiers, water and optionally a cellulose gum ether. Examples of these non-dairy whipped toppings can be found in U.S. Pat. Nos. 2,868,653; 3,353,965 and 3,479,190. Other commercial topping formulations may contain water, hydrogenated cocoanut and palm kernel oil, sugar, dextrose, sodium caseinate, polysorbate 60, sorbitan monostearate, carrageenan, guar gum, potassium chloride, vanilla and artificial coloring matter. Any non-dairy topping material which can be whipped into a firm consistency and remain as such at normal temperatures may be employed in the practice of this invention.

Various commercially available cream cheese and powdered sugar may be employed in the practice of this invention. The following example illustrates various features of the present invention.

EXAMPLE

A cheese cake was prepared according to the following procedure. Twelve ounces of cream cheese was placed in a bowl at room temperature until soft. Six ounces of powdered sugar and 1 teaspoon of vanilla were added and the mixture was blended together using an electric mixer. Four ounces of non-dairy whipped topping was then folded into the mixture. The entire mixture was then poured into an eight inch pie plate which contained a crust of crushed graham crackers prepared beforehand. The pie plate was then placed into a refrigerator for one hour at 40° F. Upon removal from the refrigerator, the texture of the cake was found to be sufficiently firm to allow for slicing into individual serving portions. The cake compared flavorably with cheese cake prepared by baking.

The embodiments of the invention in which an exclusive property or privilege is claimed are defined as follows:

1. A process for preparing an unbaked cheese cake which comprises: (a) forming a mixture consisting essentially of cream cheese, non-dairy whipped topping and powdered sugar, the mixture containing from about ten to twenty-five weight percent of topping, from about fifteen to forty weight percent of sugar and the balance being cheese and (b) refrigerating said mixture for a period of time until firm to produce said cheese cake in final form without baking.

2. The process of claim 1 wherein the amount of non-dairy whipped topping is present at a concentration range from about 15 to 25 weight percent based on the total weight of the mixture.

3. The process of claim 1 wherein the amount of non-dairy whipped topping is present at a concentration of about 18 to about 28 weight percent based on the total weight of the mixture.

4. The process of claim 1 wherein the amount of powdered sugar is present at a concentration of about 18 to about 28 weight percent based on the total weight of the mixture.

5. The process of claim 1 which further comprises: placing the mixture in an edible shell prior to refrigerating.

6. A cheese cake produced by the process of claim 5.

7. A cheese cake produced by the process of claim 1.

* * * * *